United States Patent

Sugimura

Patent Number: 5,789,126
Date of Patent: Aug. 4, 1998

[54] ELECTROPHOTOGRAPHIC PHOTOCONDUCTOR

[75] Inventor: Hiroshi Sugimura, Habikino, Japan

[73] Assignee: Sharp Kabushiki Kaisha, Osaka, Japan

[21] Appl. No.: 884,060

[22] Filed: Jun. 27, 1997

[30] Foreign Application Priority Data

Jun. 28, 1996 [JP] Japan .................................. 8-169097

[51] Int. Cl.⁶ .................................................. G03G 5/047
[52] U.S. Cl. ........................................ 430/58; 430/59; 430/96
[58] Field of Search .................................... 430/58, 96

[56] References Cited

U.S. PATENT DOCUMENTS

| | | |
|---|---|---|
| 4,840,861 | 6/1989 | Staudenmayer et al. ............ 430/96 |
| 4,847,175 | 7/1989 | Pavlisko et al. ..................... 430/96 |
| 5,190,840 | 3/1993 | Weiss et al. ......................... 430/58 |

FOREIGN PATENT DOCUMENTS

| | | |
|---|---|---|
| 58-066947A | 4/1983 | Japan . |
| 60-2507145A | 10/1985 | Japan . |
| 62-212660A | 9/1987 | Japan . |
| 63-1010457A | 5/1988 | Japan . |
| 4-A274434 | 9/1992 | Japan . |
| 4-A310959 | 11/1992 | Japan . |
| 6-A273948 | 9/1994 | Japan . |
| 6-A289629 | 10/1994 | Japan . |

*Primary Examiner*—Roland Martin

[57] ABSTRACT

Provided is an electrophotographic photoconductor comprising an electroconductive support and a photosensitive layer including a charge generation layer and a charge transport layer formed on the charge generation layer, the photosensitive layer being formed on the electroconductive support either directly or via an intermediate layer, wherein the charge transport layer contains a polyester resin having a structural unit (1) and a structural unit (2):

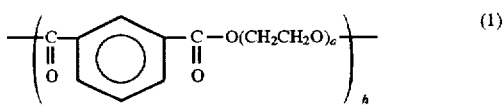

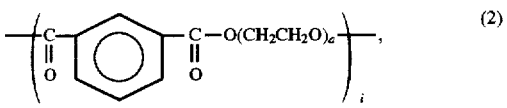

wherein h:i is from 3:7 to 7:3, (h+i) is an integer from 10 to 1000, and a is an integer from 1 to 10, and the weight of the polyester resin is from 10 to 30 wt % to the total weight of resins contained in said charge transport layer. The residual potential of the photoconductor does not increase even upon repeated use under high temperature and high humidity. When a polycarbonate resin is contained as a binding resin in the charge transport layer, the surface of the photoconductor can be made tough and hardly scratched.

8 Claims, 2 Drawing Sheets

ELECTROPHOTOGRAPHIC PHOTOCONDUCTOR

BACKGROUND OF THE INVENTION

1. Field of the Invention

The present invention relates to an electrophotographic photoconductor and, more particularly, to an electrophotographic photoconductor which improves in durability and residual potential under high temperature and high humidity.

2. Description of the Related Arts

Electrophotographic photoconductors which have now been practically used are roughly classified into inorganic photoconductors using inorganic materials and organic photoconductors using organic materials. Representative examples of the electrophotographic photoconductors belonging to the inorganic photoconductors are those of a selenium type made of amorphous selenium (a-Se), amorphous selenium arsenic (a-AsSe) and the like; those in which zinc oxide (ZnO) or cadmium sulfide (CdS) sensitized with dyes is dispersed in a binding resin; and those made of amorphous silicon (a-Si). However, among the above-mentioned inorganic photoconductors, the selenium-type photoconductors and CdS-containing photoconductors are poor in heat resistance and stability upon storage. In addition to that, since they are toxic, they cannot be just thrown away but are to be recovered. The photoconductors in which ZnO is dispersed in a resin are now scarcely used since they have a weak sensitivity and poor durability. The a-Si-type photoconductors have advantages of high sensitivity and high durability but they have disadvantages such as defects in pictures resulted from their complicated manufacturing processes.

On the other hand, representative examples of the organic photoconductors are those of a single layered type using a charge transfer complex of 2,4,7-trinitro-9-fluorenone (TNF) and polyvinylcarbazole (PVK), and those of a functionally separated type. The organic photoconductors of the functionally separated type have a layer containing a charge generation material which generates charged carriers upon illumination by light (hereinafter, referred to as a charge generation layer) and another layer containing a charge transport material which receives the charged carriers generated in the charge generation layer and transports them (hereinafter, referred to as a charge transport layer). There are many kinds of organic materials which may be utilizable for making the organic photoconductors. By suitably selecting materials, organic photoconductors having a good stability upon storage and having less toxicity can be manufactured at low cost. Accordingly, these organic photoconductors have been receiving a favorable public attention as one of the most important photoconductors. However, the organic photoconductors of the above-mentioned PVK-TNF charge transfer complex type have not exhibited sufficient sensitivity yet although various improvement have been made thereon.

On the other hand, the organic photoconductors of the above-mentioned functionally separated type having a layered structure of the charge generation layer and the charge transport layer exhibit a relatively good sensitivity and are the mainstream of the organic photoconductors which are now practically used.

In a conventional organic photoconductor of the functionally separated type, the charge generation layer is a thin film formed by applying a solution of Chlorodiane Blue in an organic amine and the charge transport layer is of a hydrazone compound. In another conventional organic photoconductor, the charge generation layer is of a bisazo compound and the charge transport layer is of a hydrazone compound. Further, it has been proposed to use anthanthrone which is a kind of pigment and a quinone compound as the charge generation material.

The organic photoconductors are manufactured by applying a photosensitive layer on an electroconductive support. With respect to manufacturing methods, a baker applicator method, a bar coater method, etc. are known in the case of a sheet, while a spray method, a vertical ring method, a dip coating method, etc. are known in the case of a drum. Usually, the dip coating method is used because of the apparatus therefor is simple and convenient.

Although these organic photoconductors have sufficient properties concerning initial electrophotographic characteristics, they do not exhibit satisfactory properties in terms of durability at present. For example, in terms of electric characteristics, repeated use may cause an increase in a residual potential or a decrease in a charged potential. Moreover, there is a problem that when the photoconductor comes in touch with a toner, developer, paper, cleaning blade, etc. in an apparatus, the surface of the photoconductor is worn away or is scraped. Such a phenomenon results in the filming of the toner or a deficiency of an image. Further problem is a run of the image due to ozone and nitrogen oxides generated by corona discharge. Therefore, various investigations have been carried out for binding resins which are used for forming a photosensitive layer.

For example, in the Japanese Laid-Open Patent Publication Hei04-274434, there is proposed an electrophotographic photoconductor wherein a polyester having a specific structure is used as a binding resin; in the Japanese Laid-Open Patent Publication Sho60-207145, there is proposed another electrophotographic photoconductor of the single layered type wherein a mixture of polyester with polycarbonate is used for improving resistance to humidity; and, in the Japanese Laid-Open Patent Publication Hei06-273948, there is proposed still another electrophotographic photoconductor of the single layered type wherein a mixture of polyester and polycarbonate is used for improving close contact with the surface of the base material.

Further, in the Japanese Laid-Open Patent Publication Hei04-310959, there is proposed an electrophotographic photoconductor of the single layered type and the functionally separated type in which a polyester having a specific structure is contained in an amount of 0.1 to 30% in the charge generation layer for improving close contact with a base material.

Besides these, in the Japanese Laid-Open Patent Publication Sho63-110457, there is disclosed an electrophotographic photoconductor of the functionally separated type wherein the charge transport layer is formed on an electroconductive layer and the charge generation layer is laminated thereon, a polyester is used as a binding resin for the charge transport layer, and thermosetting resin is used as a binder for the charge generation layer. In the Japanese Laid-Open Patent Publication Hei06-289629, there is proposed an electrophotographic photoconductor of the functionally separated type in which a mixture of polyester, polycarbonate and polyarylate is used as a binding resin for the charge transport layer.

Furthermore, in the Japanese Laid-Open Patent Publication Sho58-66947, there is proposed an electrophotographic photoconductor in which a polyester having a specific structure is contained as a matrix resin whereby solubility is improved.

In spite of the above-mentioned various proposals, the present condition is that organic photoconductors having a uniformly coated layer, sufficient mechanical strength and good characteristic properties have not been available yet. In the organic photoconductors of the single layered type, it has been difficult to maintain the mechanical strength and to prevent an increase in the residual potential. As for the organic photoconductors of the functionally separated type, those having good durability have not been available yet as well. For example, in the case of an electrophotographic photoconductor of the functionally separated type described in the Japanese Laid-Open Patent Publication Sho62-212660 wherein a mixture of polycarbonate and polyester is used for improving close contact with an electroconductive support, there is a problem that the polyester used contains terephthalic acid as a structural unit and accordingly that its solubility is poor, whereby a deficiency in the coated film such as crystallization is often noted. In addition, although its initial electrophotographic characteristics are good, the residual potential increases upon repeated use.

In recent years, as copying machines, printers and telefax machines for ordinary paper have become more and more durable in printing a huge number of paper sheets and have become faster and faster in printing speed, there have been a great demand for photoconductors improved in durability.

Furthermore, such machines are now being used in various countries. When they are repeatedly used for long time under severe circumstances of high temperature and high humidity such as in tropical and subtropical countries, fog is formed on resulting pictures and therefore they cannot be used any longer. This is because the residual potential increases largely under high temperature and high humidity.

SUMMARY OF THE INVENTION

Accordingly, an object of the present invention is to provide an electrophotographic photoconductor having good durability whereby, even under high temperature and high humidity, the residual potential can be prevented from increasing upon repeated use and clear pictures without fog can be produced.

The present invention provides an electrophotographic photoconductor comprising an electroconductive support and a photosensitive layer including a charge generation layer and a charge transport layer formed on the charge generation layer, the photosensitive layer being formed on the electroconductive support either directly or via an intermediate layer, wherein the charge transport layer contains a polyester resin having a structural unit (1) and a structural unit (2):

wherein h:i is from 3:7 to 7:3, (h+i) is an integer from 10 to 1000, and a is an integer from 1 to 10, and the weight of the polyester resin is from 10 to 30 wt % to the total weight of resins contained in said charge transport layer.

DETAILED DESCRIPTION OF THE PREFERRED EMBODIMENTS

The polyester resin used in the present invention has a structural units (1) and (2), and their ratio in terms of h:i being set to be within the range of 3:7 to 7:3. This is because, when the structural unit (1) having substituents at the meta-position is too much, the glass transition point becomes low and the photoconductor becomes soft and is apt to be scratched and, when the structural unit (2) having substituents at the para-position is too much, the solubility becomes poor and a uniformly coated film is not formed.

The electrophotographic photoconductor of the present invention is also characterized in that the charge transport layer contains a polycarbonate resin besides the above-mentioned polyester resin.

The polycarbonate resin is represented by the structural formula (3):

wherein $R_1$–$R_8$ are, the same or different, a hydrogen atom, a halogen atom, an alkyl group having 1–5 carbon atom(s), an alkenyl group having 2–5 carbon atoms, an alkoxy group having 1–5 carbon atom(s), an aryl group having 6–12 carbon atoms or an aralkyl group having 7–17 carbon atoms, the aryl and aralkyl groups being optionally substituted with an alkyl group having 1–5 carbon atom(s), an alkenyl group having 2–5 carbon atoms, an alkoxy group having 1–5 carbon atom(s) or a halogen atom. X is wherein $R_9$ and $R_{10}$ are, the same or different, a hydrogen atom, a halogen atom, an alkyl group having 1–5 carbon atom(s), an alkenyl group having 2–5 carbon atoms, an alkoxy group having 1–5 carbon atom(s) or an aryl group having 6–12 carbon atoms, the aryl group being optionally substituted with an alkyl group having 1–5 carbon atom(s), an alkenyl group having 2–5 carbon atoms, an alkoxy group having 1–5 carbon atom(s ) or a halogen atom or $R_9$ and $R_{10}$ may be bonded together to give a group forming a carbocyclic or heterocyclic ring optionally substituted with the above-mentioned substituents; and b is a bond or an integer from 1 to 20; and A is wherein $R_{11}$ is an alkyl group having 1–5 carbon atom(s); and n is an integer from 10 to 1,000.

Figure 1:
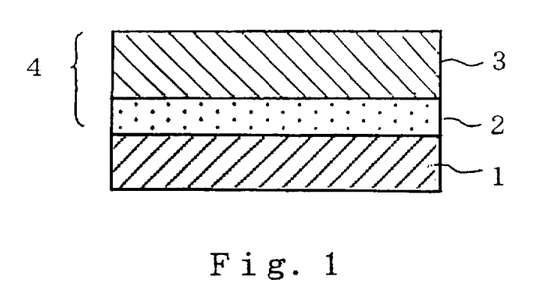
FIG. 1 is a schematic sectional view illustrating the structure of an embodiment of the electrophotographic photoconductor of the present invention.
Figure 2:
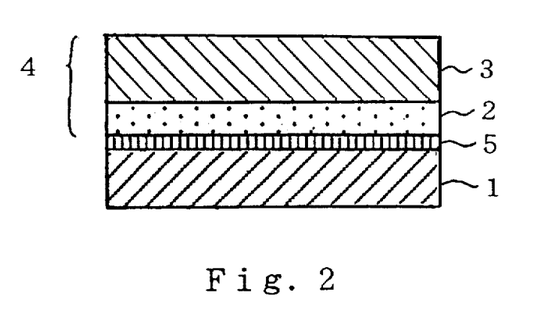
FIG. 2 is a schematic sectional view illustrating the structure of another embodiment of the electrophotographic photoconductor of the present invention.

Embodiments of the photoconductor of the present invention are shown in FIGS. 1 and 2. FIG. 1 shows a photoconductor of the functionally separated type in which a charge generation layer 2 is layered on an electroconductive support 1 and then a charge transport layer 3 is further layered on the charge generation layer 2. Alternatively, as shown in FIG. 2, an undercoating layer may be placed as an intermediate layer 5 between the electroconductive support 1 and the charge generation layer 2.

As the electroconductive support in the present invention, usable is a base material which itself has electroconductivity such as aluminum, aluminum alloy, copper, zinc, stainless steel, nickel and titanium. Also usable are plastic or paper which is vapor-deposited with aluminum, gold, silver, copper, zinc, nickel, titanium, indium oxide, tin oxide, etc.; plastic or paper which contains electroconductive particles; plastic which contains electroconductive polymer; and the like. The electroconductive support may be shaped in the form of a drum, sheet, seamless belt, etc.

Examples of the charge generation materials in the charge generation layer are inorganic photoelectroconductive materials such as selenium and its alloy, arsenic-selenium, cadmium sulfide, zinc oxide, amorphous silicon, etc.; organic pigments such as phthalocyanine, azo compounds, quinacridone, polycyclic quinones, perylene, etc.; and organic dyes such as thiapyrylium salts and squarylium salts. In the charge generation layer, electron-accepting materials such as cyano compounds (for example, tetracyano ethylene and 7,7,8,8-tetracyano-quinodimethane), quinones (for example, anthraquinone and p-benzoquinone) and nitro compounds (for example, 2,4,7-trinitrofluorenone and 2,4,5,7-tetranitrofluorenone) may be added as chemical sensitizers, or dyes such as xanthene dyes, thiazine dyes and triphenylmethane dyes may be added as optical sensitizers.

The charge generation layer may be formed by a gas-phase deposition method such as vacuum deposition, sputtering and chemical vapor deposition. Alternatively, the charge generation material may be dissolved or pulverized and dispersed by means of a ball mill, a sand grinder, a paint shaker, an ultrasonic disperser, etc. followed, if necessary, by addition of a binding resin thereto and, formed into the charge generation layer by a baker applicator, a bar coater, casting method or spin coating method in the case of a sheet, and by a spray method, vertical ring method, or dip coating method, in the case of a drum.

As the binding resin, usable are polyarylates, polyvinyl butyral, polycarbonates, polyesters, polystyrene, polymethyl methacrylate, polyvinyl chloride and phenoxy, epoxy and silicone resins, etc.

As the solvent, usable are ketones such as acetone, methyl ethyl ketone and cyclohexanone; esters such as ethyl acetate and butyl acetate; ethers such as tetrahydrofuran and dioxane; aromatic hydrocarbons such as benzene, toluene and xylene; aprotic polar solvents such as N,N-dimethylformamide and dimethyl sulfoxide; etc.

The thickness of the charge generation layer is from 0.05 to 5 μm and is preferably from 0.08 to 1 μm.

Examples of the charge transport materials applicable in the charge transport layer are high-molecular compounds such as polyvinyl carbazole and polysilane compounds; and low-molecular compounds such as hydrazone compounds, pyrazoline compounds, oxadiazole compounds, stilbene compounds, triphenylmethane compounds, triphenylamine compounds and enamine compounds.

The charge transport layer may be formed by dissolving the charge transport material in a solvent, then adding the binding resin of the present invention thereto and applying the mixture by a baker applicator, a bar coater, casting method or spin coating method, in the case of a sheet, and by a spray method, vertical ring method, dip coating method, etc. in the case of a drum.

The polycarbonate resin of the structural formula (3) may be prepared by a known method. For instance, it comprises polymerising a dihydric phenol with phosgene and terminating by a monofunctional compound. Examples of the dihydric phenols are 4,4'-(1-methylethylidene)bisphenol, 4,4'-(1-methylethylidene)-bis[2-methylphenol], 4,4'-cyclohexylidene-bisphenol, 4,4-ethylidene bisphenol, 4,4'-(1,3-dimethyl-butylidene) bisphenol, 4,4'-(1-methylethylidene) bis[2,6-dimethylphenol], 4,4'-(1-phenylethylidene) bisphenol, 4,4'-(2-ethylhexylidene) bisphenol, 5,5'-(1-methylethylidene) [1,1'-biphenyl]-2-ol, [1,1'-biphenyl]-4,4'-diol, 4,4'-methylidene bisphenol, 4,4'-methylene bis[2-(2-propenyl)-phenol], 4,4'-methylidene bis [2-methylphenol], 4,4'-propanediyl bisphenol, 4,4'-(1-methyl-propylidene) bisphenol, 4,4'-(2-methylpropylidene) bisphenol, 4,4'-(3-methylbutylidene) bisphenol, 4,4'-cyclopentylidene bisphenol, 4,4'-(phenylmethylidene) bisphenol, 4,4'-(1-methylheptylidene) bisphenol, 4,4'-cyclohexylidene bis[3-methylphenol], 4,4'-(1-methylethylidene) bis[2-(2-propenyl)phenol], 4,4'-(1-methylethylidene) bis[2-(1-methylethyl)phenol], 4,4'-(1-methyloctylidene) bisphenol, 4,4'-(1-phenylethylidene) bis [2-methylphenol], 4,4'-cyclohexylidene bis[2,6-dimethylphenol], 4,4'-(1-methyl)nonylidene bisphenol, 4,4'-decylidene bisphenol, 4,4'-(1-methylethylidene) bis[2-(1,1-methylpropyl)-phenol, 4,4'-(1-methylethylidene) bis[2-(1,1-dimethylethyl)-phenol, 4,4'-(diphenylmethylidene) bisphenol, 4,4'-cyclo-hexylidene bis[2-(1,1-dimethylethyl) phenol], 4,4'-(2-methylpropylidene) bis[3-methyl-6-(1,1-dimethylethyl)phenol], 4,4'-(1-methylethylidene) bis[2-cyclohexylphenol], 4,4'-methylene bis[2,6-bis(1,1-dimethylethyl)phenol], 4,4'-methylene bis[2,6-di-sec-butylphenol], 5,5'-(1,1-cyclohexylidene) bis(1,1'-biphenyl)-2-ol, 4,4'-cyclohexylidene bis[2-cyclohexyl- phenol], 2,2'-methylene bis [4-nonylphenol], 4,4'-(1-methyl-ethylidene) bis[2,6-bis(1,1-dimethylethyl)phenol], 5,5'-(1-phenol-ethylidene) [1,1'-biphenyl]-2-ol, bis(4-hydroxyphenyl)-methanone, 4,4'-methylene bis[2-fluorophenol], 4,4'-[2,2,2-trifluoro-1-(trifluoromethyl)-ethylidene] bisphenol, 4,4'-isopropylidene bis[2-fluorophenol], 4,4'-[(4-fluorophenyl)-methylene] bis[2-fluorophenol], 4,4'-(phenylmethylene) bis [2-fluorophenol], 4,4'-[(4-fluorophenyl)methylene] bisphenol, 4,4'-(1-methylethylidene) bis[2-chloro-6-methylphenol], 4,4'-(1-methylethylidene) bis[2,6-dichlorophenol], 4,4'-(1-methylethylidene) bis[2-chlorophenol], 4,4'-methylene bis[2,6-dibromophenol], 4,4'-(1-methylethylidene) bis[2,6-dibromophenol], 4,4'-(1-methylethylidene) bis[2-nitrophenol], 3,3'-dimethyl-[1,1'-biphenyl]-4,4'-diol, 3,3',5,5'-tetramethyl-[1,1'-biphenyl]-4,4'-diol, 3,3',5,5'-tetra-t-butyl-[1,1'-biphenyl]-4,4'-diol, 3,3'-difluoro-[1,1'-biphenyl]-4,4'-diol and 3,3',5,5'-tetrafluoro-[1,1'-biphenyl]-4,4'-diol. Two or more of those compounds may be used jointly. Especially from the viewpoint of the reactivity, the use of 4,4'-(1-methylethylidene) bisphenol, 4,4'-(1-methylethylidene) bis(2-methylphenol) or 4,4'-cyclohexylidene biphenyl is preferred. For termination, n-butyl p-hydroxybenzoate. n-propyl p-hydroxybenzoate and ethyl p-hydroxybenzoate are preferably usable.

Examples of the solvents applicable are halogenic solvents such as dichloromethane and 1,2-dichloroethane; ketones such as acetone, methyl ethyl ketone and cyclohexanone; esters such as ethyl acetate and butyl acetate; ethers such as tetrahydrofuran and dioxane; aromatic hydrocarbons such as benzene, toluene and xylene; aprotic polar solvents such as N, N-dimethylformamide and dimethyl sulfoxide; etc.

The thickness of the charge transport layer is from 5 to 50 μm or, preferably, from 10 to 40 μm.

Two parts by weight of a bisazo pigment which is a charge generation material represented by the above-given structural formula, 1 part by weight of an epoxy resin (Rikaresin BPO-20E; manufactured by New Japan Chemical) and 97 parts by weight of dimethoxyethane were dispersed for six hours using a paint shaker to prepare a dispersion. This was filled in a tank and applied onto a cylindrical support made of aluminum (diameter: 80 mm; length: 348 mm) by dipping the support into the dispersion, pulling it up and drying at room temperature for an hour. A charge generation layer of 0.3 μm thickness was thus obtained.

An antioxidant may be added as an additive to the charge generation layer or to the charge transport layer. Examples of the antioxidants applicable are vitamin E, hydroquinone, hindered amines, hindered phenols, p-phenylenediamine, arylalkanes and derivatives thereof as well as organic sulfur compounds and organic phosphorus compounds.

As the intermediate layer which is placed between the electroconductive support and the photosensitive layer, usable are an anodically oxidized aluminum film and also polyvinyl alcohol, polyvinyl butyral, polyvinyl pyrrolidone, polyacrylic acid, celluloses, gelatin, starch, polyurethane, polyimides, casein, N-methoxymethylated nylons, etc. Furthermore, particles of titanium oxide, tin oxide, aluminum oxide, etc. may be dispersed thereinto.

EXAMPLES

The present invention will now be specifically illustrated by way of the following embodiments although the present invention is not limited to the following embodiments only.

Example 1

In the mean while, 100 parts by weight of a hydrazone compound represented by the above structural formula as the charge transport material together with 90 parts of a polycarbonate resin (C-1400; manufactured by Teijin Kasei) and 10 parts of a polyester represented by the following structural formula, both as binding resins, were dissolved in 800 parts by weight of dichloromethane to prepare a painting solution for the charge transport layer. The above-prepared charge generation layer was dip-coated with the resulting paining solution followed by drying at 80° C., for an hour, to form a charge transport layer having a thickness of 22 μm. A sample of the electrophotographic photo conductor was thus prepared.

wherein h, i and a have the same meanings as defined for the structural units (1) and (2); (j+k) is an integer from 10 to 1,000; b is an integer from 1 to 10; and the symbols * and # mean that the upper and the lower lines having the same symbol are connected.

The resulting sample was installed in a commercially available copying machine (SF8870; manufactured by Sharp Kabushiki Kaisha) under the conditions of normal temperature and normal humidity (20° C./50%), and of high temperature and high humidity (35° C./85%) and copying tests were conducted using paper in a size of A4. With respect to the characteristics in an initial stage and after subjecting to 40,000 copyings, picture characteristics, charged potential ($V_o$), potential of white manuscript ($V_L$) and residual potential ($V_R$) were measured. Results of the measurement under normal temperature and normal humidity (abbreviated as N/N) and those under high temperature and high humidity (abbreviated as H/H) are shown in Table 1. It is apparent that, both in the initial stage and after repeated use, clear pictures were obtained and the increase in the potential was little.

TABLE 1

(unit: volts)

| | Initial | | | After 40000 copyings | | |
|---|---|---|---|---|---|---|
| | $V_O$ | $V_L$ | $V_R$ | $V_O$ | $V_L$ | $V_R$ |
| | N/N | | | | | |
| Example 1 | −720 | −220 | −22 | −730 | −230 | −28 |
| Example 2 | −720 | −220 | −20 | −720 | −225 | −25 |
| Example 3 | −720 | −220 | −18 | −720 | −225 | −22 |
| Comparative Example 1 | −725 | −225 | −25 | −725 | −230 | −35 |
| Comparative Example 2 | −720 | −225 | −23 | −725 | −230 | −29 |
| Comparative Example 3 | −720 | −220 | −17 | −720 | −220 | −22 |
| Example 4 | −730 | −270 | −25 | −730 | −275 | −33 |
| Example 5 | −725 | −200 | −15 | −720 | −205 | −19 |
| Example 6 | −725 | −190 | −14 | −720 | −195 | −19 |
| Example 7 | −730 | −210 | −17 | −720 | −220 | −21 |
| Example 8 | −735 | −210 | −15 | −725 | −215 | −21 |
| Example 9 | −720 | — | −13 | −710 | — | −17 |
| | H/H | | | | | |
| Example 1 | −730 | −215 | −28 | −735 | −220 | −34 |
| Example 2 | −730 | −215 | −26 | −735 | −220 | −33 |
| Example 3 | −730 | −215 | −24 | −735 | −220 | −30 |
| Comparative Example 1 | −735 | −225 | −30 | −780 | −300 | −135 |
| Comparative Example 2 | −730 | −225 | −27 | −775 | −280 | −102 |
| Comparative Example 3 | −730 | −210 | −24 | −730 | −215 | −30 |
| Example 4 | −735 | −265 | −31 | −735 | −270 | −37 |

TABLE 1-continued (unit: volts)

| | Initial | | | After 40000 copyings | | |
|---|---|---|---|---|---|---|
| | $V_O$ | $V_L$ | $V_R$ | $V_O$ | $V_L$ | $V_R$ |
| Example 5 | −735 | −195 | −21 | −735 | −200 | −27 |
| Example 6 | −730 | −185 | −21 | −730 | −190 | −28 |
| Example 7 | −735 | −205 | −24 | −730 | −210 | −30 |
| Example 8 | −740 | −200 | −20 | −735 | −210 | −27 |
| Example 9 | −730 | — | −19 | −730 | — | −24 |

Example 2

The same operation as in Example 1 was conducted except that 80 parts by weight of the polycarbonate resin and 20 parts by weight of the polyester resin of the present invention were used as the binding resins and the product was evaluated. The result is given in Table 1. Clear pictures were obtained both in the initial stage and after the use.

Example 3

The same operation as in Example 1 was conducted except that 70 parts weight of the polycarbonate resin and 30 parts by weight of the polyester resin of the present invention were used as the binding resins and the product was evaluated. The result is given in Table 1. Clear pictures were obtained both in the initial stage and after the use.

Comparative Example 1

The same operation as in Example 1 was conducted except that 100 parts weight of the polycarbonate resin was used as the binding resin and the product was evaluated. The result is given in Table 1. Although clear pictures were obtained both in the initial stage and after the use, a fog due to an increase in the residual potential appeared in the picture under high temperature and high humidity.

Comparative Example 2

The same operation as in Example 1 was conducted except that 95 parts by weight of the polycarbonate resin and 5 parts by weight of the polyester resin of the present invention were used as the binding resins and the product was evaluated. The result is given in Table 1. Although clear pictures were obtained both in the initial stage and after the use, a fog due to an increase in the residual potential appeared in the picture under high temperature and high humidity.

Comparative Example 3

The same operation as in Example 1 was conducted except that 60 parts weight of the polycarbonate resin and 40 parts by weight of the polyester resin of the present invention were used as the binding resins and the product was evaluated. The result is given in Table 1. Under high temperature and high humidity, white spots were generated on pictures and, when the photosensitive drum was taken out, the spots were considered to be due to the fact that the charge transport material was crystallized out.

Figure 3:
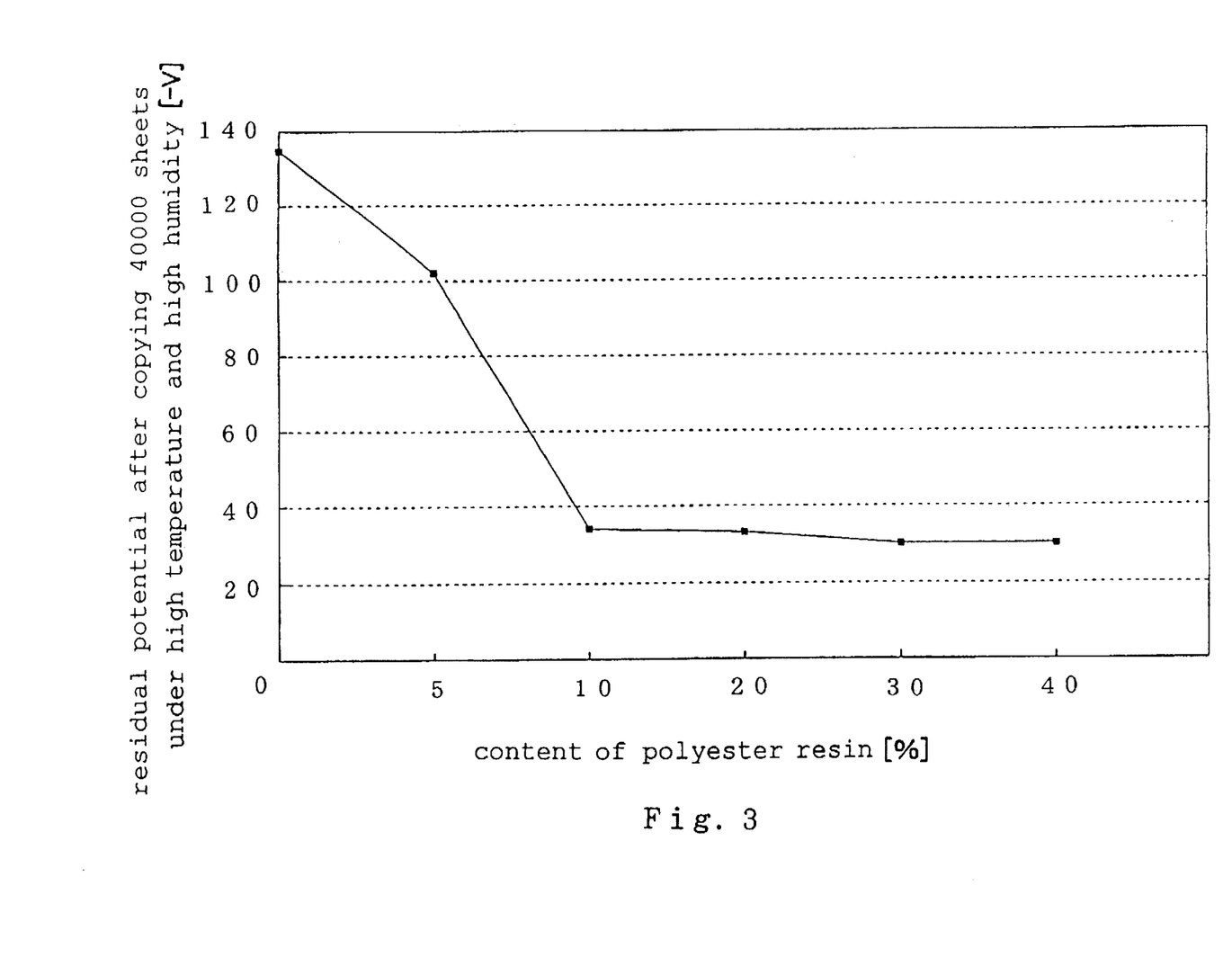
FIG. 3 is a graph showing the relationship between the content of the polyester resin of the present invention and the residual potential after copying 40000 sheets under high temperature and high humidity.

Incidentally, the relation between an increase in the residual potential and the mixing ratio of the polyester resin of the present invention under high temperature and high humidity is given in FIG. 3 for Examples 1–3 and Comparative Examples 1–3.

Example 4

Two parts by weight of a polycyclic quinone pigment which was a charge generation material shown by the above structural formula, 1 part by weight of a phenoxy resin (PKHH; manufactured by Union Carbide) and 97 parts by weight of 1,4-dioxane were dispersed for 12 hours in a ball mill dispersing machine to prepare a dispersion. The dispersion was filled in a tank and then a cylindrical support made of aluminum (an aluminum drum) having a diameter of 80 mm and a length of 348 mm was dipped thereinto and pulled up to coat the dispersion followed by drying at room temperature for an hour to form a charge generation layer having a thickness of 1 μm.

In the meanwhile, 100 parts by weight of a hydrazone compound as the charge transport material having the above structural formula together with 90 parts by weight of a polycarbonate resin (Z-400; manufactured by Mitsubishi Gas Chemical) and 10 parts by weight of the polyester resin of the present invention having the same structure as in Example 1, both as the biding resins, were dissolved in 800 parts by weight of dichloromethane to prepare a coating solution for forming the charge transport layer. The resulting coating solution was applied onto the already-prepared charge generation layer by dipping and dried at 80° C. for an hour to give a charge transport layer having a thickness of 25 μm. A sample was thus prepared. The sample had a uniformly coated film.

The sample was evaluated by the same manner as in Example 1. The result is given in Table 1. Clear pictures were obtained both in the initial stage and after the repeated use.

Example 5

Two parts by weight of a bisazo pigment which was a charge generation material having the above structural formula, 1 part by weight of a polyvinyl butyral resin (XYHL: manufactured by Union Carbide) and 97 parts by weight of cyclohexanone were dispersed in a ball mill. The resulting dispersion was filled in a tank. A cylindrical support made of aluminum having a diameter of 80 mm and a length of 348 mm was dip-coated with the dispersion, followed by drying at 110° C. for ten minutes to form a charge generation layer having a thickness of 0.8 μm.

In the meanwhile, 100 parts by weight of a hydrazone compound as the charge transport material having the above structural formula together with 80 parts by weight of a polycarbonate resin (S-2000) and 20 parts by weight of a polyester resin of the present invention having the following structural formula, both as the binding resins, were dissolved in 800 parts by weight of dichloromethane to prepare a coating liquid for forming the charge transport layer. The above-prepared charge generation layer was subjected to dip coating with the resulting coating liquid followed by drying at 80° C. for an hour, to give a charge transport layer having a thickness of 25 μm.

wherein h, i, j, k and a have the same meanings as defined already; (l+m) is an integer from 10 to 1,000; and the symbols * and # mean that the upper and the lower lines having the same symbol are connected.

The product was subjected to the same evaluation as in Example 1. The result is given in Table 1. Clear pictures were obtained both in the initial stage and after the repeated use.

Example 6

The same operation as in Example 5 was conducted except that used was 100 parts by weight of a hydrazone compound as the charge transport material having the above structure together with 80 parts by weight of a polycarbonate resin (viscosity average molecular weight: about 40,000) having the following structure and 20 parts by weight of the polyester resin having the same structure as in Example 1, both as a binding resin for the charge transport layer. The resulting product was evaluated. The result is given in Table 1. Even under high temperature and high humidity, clear pictures were obtained both in the initial stage and after the repeated use.

wherein n has the same meaning as defined for the structural formula (3).

When the photoconductor after the use was repeatedly used still further. After copying 100,000 sheets of paper in total, the thickness of the photoconductor was measured and found to be 22 μm wherefrom it was apparent that only 3 μm was worn away.

Example 7

Six parts by weight of methoxymethylated nylon (EF-30T; manufactured by Teikoku Chemical) were dissolved in a mixed solvent of 47 parts by weight of methyl alcohol and 47 parts by weight of 1,2-dichloroethane. The solution was filled in a tank, a cylindrical support made of aluminum having a diameter of 80 mm and a length of 348 mm was subjected to dip coating by dipping thereinto, pulling out therefrom and drying at 110° C. for ten minutes to form an undercoating layer having a thickness of about 1 μm.

Two parts by weight of a bisazo pigment as the charge generation material having the above structural formula. 1 part by weight of an epoxy resin (Rikaresin BPO-20E; manufactured by New Japan Chemical) and 97 parts by weight of dimethoxymethane were dispersed for six hours using a paint shaker. The resulting dispersion was filled in a tank and the above-prepared undercoated support (aluminum drum) was subjected to dip coating with the dispersion followed by drying at room temperature for an hour to prepare a charge generation layer having a thickness of 0.2 μm.

On this charge generation layer, a charge transport layer having a thickness of 25 μm was formed by the same manner as in Example 6 to prepare a sample as shown in FIG. 2. The sample had a uniformly coated film. This sample was evaluated by the same manner as in Example 1. The result is shown in Table 1.

Example 8

The same charge generation layer using the dispersion as in Example 7 was formed by means of dip coating of a cylindrical support made of aluminum having a diameter of 80 mm and a length of 348 mm wherein an anodized aluminum layer in a thickness of 5 μm was formed by an anodizing process. After drying at 110° C. for 10 minutes, a charge generation layer having a thickness of 0.2 μm was formed.

In the meanwhile, 100 parts by weight of a triphenylamine compound having the above structural formula as the charge transport material together with 85 parts by weight of a polycarbonate resin having the following structure and 15 parts by weight of the polyester resin having the same structure as in Example 5, both as the binding resins, were dissolved in 800 parts by weight of dichloromethane to prepare a coating liquid for forming the charge transport layer. The resulting coating liquid was applied onto the above-prepared charge generation layer by dip coating followed by drying at 80° C. for an hour to prepare a charge transport layer having a thickness of 25 μm. A sample prepared had a uniformly coated film. This was evaluated by the same manner as in Example 1. The result is shown in Table 1. Clear pictures were obtained both in the initial stage and after the repeated use.

wherein n has the same meaning as defined for the structural formula (3).

Example 9

Six parts by weight of a copolymerized nylon (Amilan CM8000; manufactured by Toray) were dissolved in a mixed solvent of 47 parts by weight of methyl alcohol and 47 parts by weight of chloroform, the solution was filled in a tank and a cylindrical support made of aluminum having a diameter of 30 mm and a length of 255 mm was subjected to dip coating therewith followed by drying at 110° C. for ten minutes to form an undercoated layer having a thickness of about 2 μm.

Then 2 parts by weight of a metal-free phthalocyanine of an X type having the above structural formula as the charge generation material, 1 part by weight of a polyvinyl butyral resin (Esulec BMS; manufactured by Sekisui Chemical) and 97 parts by weight of dichloroethane were dispersed in a ball mill dispersing machine for 12 hours. The resulting dispersion was filled in a tank and the above-prepared undercoated cylindrical support made of aluminum was subjected to dip coating therewith followed by drying at room temperature for an hour to give a charge generation layer having a thickness of 0.5 μm.

In the meanwhile, 100 parts by weight of a styryl compound having the above structural formula as the charge transport material together with 90 parts by weight of a polycarbonate resin having the following structure and 10 parts by weight of the polyester resin having the same structure as in Example 1, both as the binding resin, were dissolved in 800 parts by weight of chloroform to prepare a coating liquid for forming the charge transport layer. The resulting coating liquid was applied onto the above-prepared charge generation layer by dip coating, followed by drying at 100° C. for an hour to prepare a charge transport layer having a thickness of 20 μm. A sample prepared as such has a uniformly coated film. This sample was installed in a commercially available laser beam printer (JX9500; manufactured by Sharp Kabushiki Kaisha). The result is shown in Table 1. Clear pictures were obtained both in the initial stage and after the repeated use.

transport layer, compared with the case where the polyester is contained in the charge generation layer. This is because the structural components in the polyester is considered to have the effect of releasing carriers trapped in the charge transport layer easily.

It has also become possible to obtain an organic photoconductor having good properties and good durability by the use of the polyester resin composed of the copolymer having two kinds of structural units substituted at the para- and meta-positions.

Further in accordance with the present invention, the polycarbonate resin is contained in the charge transport layer whereby it is possible to give an electrophotographic photoconductor having toughness and prominent durability wherein scratches by cleaning blades, developers, paper, etc. are hardly formed.

Still further in accordance with the present invention, the polycarbonate having the specific structure is contained whereby it is possible to give a photoconductor having little abrasion and having a long life.

What I claim is:

1. An electrophotographic photoconductor comprising an electroconductive support and a photosensitive layer including a charge generation layer and a charge transport layer formed on the charge generation layer, the photosensitive layer being formed on the electroconductive support either directly or via an intermediate layer, wherein the charge transport layer contains a polyester resin having a structural unit (1) and a structural unit (2):

(1)

wherein n has the same meaning as defined for the structural formula (3).

In accordance with the present invention, the polyester resin is composed in a suitable ratio by weight as a binding resin whereby it is now possible to give an electrophotographic photoconductor which does not separate out crystals of the charge transport material and gives a good picture without fog. The electrophotographic photoconductor has a uniformly coated layer and exhibits a stable potential characteristic under high temperature and high humidity.

In this organic photo conductive material of the functionally separated type, the residual potential is effectively prevented from increasing by using polyester in the charge -continued

(2)

wherein h:i is from 3:7 to 7:3, (h+i) is an integer from 10 to 1000, and a is an integer from 1 to 10, and the weight of the polyester resin is from 10 to 30 wt % to the total weight of resins contained in said charge transport layer.

2. An electrophotographic photoconductor according to claim 1 wherein the polyester resin is represented -continued wherein h, i and a have the same meanings as defined for the structural units (1) and (2); (j+k) is an integer from 10 to 1,000; b is an integer from 1 to 10; and the symbols * and # mean that the upper and the lower lines having the same symbol are connected, or wherein h, i, j, k and a have the same meanings ad defined in the above structures; (l+m) is an integer from 10 to 1,000; and the symbols * and # mean that the upper and the lower lines having the same symbol are connected.

3. An electrophotographic photoconductor according to claim 1 in which the charge transport layer further contains a polycarbonate resin.

4. An electrophotographic photoconductor according to claim 3 in which the polycarbonate resin is represented by the structural formula (3):

wherein $R_1$–$R_8$ are, the same or different, a hydrogen atom, a halogen atom, an alkyl group having 1–5 carbon atom(s), an alkenyl group having 2–5 carbon atoms, an alkoxy group having 1–5 carbon atom(s), an aryl group having 6–12 carbon atoms or an aralkyl group having 7–17 carbon atoms, the aryl and aralkyl groups being optionally substituted with an alkyl group having 1–5 carbon atom(s), an alkenyl group having 2–5 carbon atoms, an alkoxy group having 1–5 carbon atom(s) or a halogen atom. X is wherein $R_9$ and $R_{10}$ are, the same or different, a hydrogen atom, a halogen atom, an alkyl group having 1–5 carbon atom(s), an alkenyl group having 2–5 carbon atoms, an alkoxy group having 1–5 carbon atom(s) or an aryl group having 6–12 carbon atoms, the aryl group being optionally substituted with an alkyl group having 1–5 carbon atom(s), an alkenyl group having 2–5 carbon atoms, an alkoxy group having 1–5 carbon atom(s) or a halogen atom, or $R_9$ and $R_{10}$ may be bonded together to give a group forming a carbocyclic or heterocyclic ring optionally substituted with the above-mentioned substituents; and b is a bond or an integer from 1 to 20; and A is wherein $R_{11}$ is an alkyl group having 1–5 carbon atom(s); and n is an integer from 10 to 1,000.

5. An electrophotographic photoconductor according to claim 1 in which the charge generation layer has a thickness of 0.05 to 5 μm.

6. An electrophotographic photoconductor according to claim 5 in which the charge generation layer has a thickness of 0.08 to 1 µm.

7. An electrophotographic photoconductor according to claim 1 in which the charge transport layer has a thickness of 5 to 50 µm.

8. An electrophotographic photoconductor according to claim 7 in which the charge transport layer has a thickness of 10 to 40 µm.

* * * * *